(12) United States Patent
Bastian et al.

(10) Patent No.: US 8,286,507 B2
(45) Date of Patent: Oct. 16, 2012

(54) TORQUE SENSOR ARRANGEMENT (75) Inventors: Markus Bastian, Mainz (DE); Manfred Goll, Glauburg (DE)

(73) Assignee: Continental Teves AG & Co. oHG (DE)

( * ) Notice: Subject to any disclaimer, the term of this patent is extended or adjusted under 35 U.S.C. 154(b) by 372 days.

(21) Appl. No.: 12/517,678

(22) PCT Filed: Dec. 7, 2007

(86) PCT No.: PCT/EP2007/063550
§ 371 (c)(1),
(2), (4) Date: Feb. 24, 2010

(87) PCT Pub. No.: WO2008/068339
PCT Pub. Date: Jun. 12, 2008

(65) Prior Publication Data
US 2010/0139419 A1   Jun. 10, 2010

(30) Foreign Application Priority Data

Dec. 7, 2006 (DE) .......................... 10 2006 058 060
Dec. 7, 2007 (DE) .......................... 10 2007 059 361

(51) Int. Cl.
*G01L 3/00* (2006.01)
(52) U.S. Cl. .................................................. 73/862.325
(58) Field of Classification Search ............ 73/862.331–862.338, 862.325
See application file for complete search history.

(56) References Cited

U.S. PATENT DOCUMENTS

| | | | |
|---|---|---|---|
| 4,984,474 A | 1/1991 | Matsushima et al. | |
| 6,644,134 B2 | 11/2003 | Laidlaw et al. | |
| 6,810,336 B2 | 10/2004 | Nakane et al. | |
| 6,912,923 B2 | 7/2005 | Froehlich et al. | |
| 6,928,887 B2 | 8/2005 | Nakane et al. | |
| 6,928,888 B2 | 8/2005 | Nakane et al. | |
| 7,028,545 B2 | 4/2006 | Gandel et al. | |
| 7,174,795 B2 * | 2/2007 | Feng et al. | 73/862.332 |
| 7,293,472 B2 | 11/2007 | Tokumoto et al. | |
| 7,406,884 B2 * | 8/2008 | Jerems et al. | 73/862.331 |
| 7,639,004 B2 * | 12/2009 | Islam et al. | 324/207.25 |
| 2002/0189371 A1 | 12/2002 | Nakane et al. | |
| 2005/0126310 A1 | 6/2005 | Sugimura et al. | |
| 2008/0028870 A1 | 2/2008 | Tokumoto et al. | |

(Continued)

FOREIGN PATENT DOCUMENTS

DE   102 22 118 A1   11/2002

(Continued)

*Primary Examiner* — Lisa Caputo
*Assistant Examiner* — Octavia Davis-Hollington
(74) *Attorney, Agent, or Firm* — RatnerPrestia (57) ABSTRACT

A sensor arrangement for measurement of a torque acting on a shaft, wherein the shaft has a first shaft section and a second shaft section and these two shaft sections can rotate with respect to one another, having at least one magnetic encoder which is arranged on the first shaft section and having a stator which is arranged on the second shaft section, wherein the stator has two stator elements each having projecting fingers, and a flux concentrator is associated with each of the stator elements and directly or indirectly supplies to a magnetic field sensor element the magnetic field which is to be detected and is produced by the magnetic encoder, wherein the at least one flux concentrator includes a ring or ring sector, is arranged essentially in the radial outer area with respect to at least one stator element and is magnetically coupled thereto via an air gap.

13 Claims, 11 Drawing Sheets

U.S. PATENT DOCUMENTS

| | | |
|---|---|---|
| 2008/0250873 A1 | 10/2008 | Prudham et al. |
| 2008/0258715 A1 | 10/2008 | Reichert |
| 2008/0295612 A1 | 12/2008 | Rachui et al. |

FOREIGN PATENT DOCUMENTS

| | | |
|---|---|---|
| DE | 103 46 332 A1 | 4/2004 |
| DE | 602 00 499 T2 | 5/2005 |
| DE | 10 2004 055 124 A1 | 5/2006 |
| DE | 103 46 000 B4 | 6/2006 |
| DE | 10 2005 011 196 A1 | 9/2006 |
| DE | 10 2005 018 286 A1 | 10/2006 |
| DE | 10 2005 038 514 A1 | 2/2007 |
| EP | 1 464 935 A1 | 11/2003 |
| GB | 239277 | 6/1924 |
| WO | WO 02/071019 A1 | 9/2002 |
| WO | WO 2005/108943 A1 | 11/2005 |
| WO | WO 2006/008425 A1 | 1/2006 |
| WO | WO 2007/003468 A1 | 1/2007 |

* cited by examiner

TORQUE SENSOR ARRANGEMENT

CROSS REFERENCE TO RELATED APPLICATIONS

This application is the U.S. national phase application of PCT International Application No. PCT/EP2007/063550, filed Dec. 7, 2007, which claims priority to German Patent Application No. DE102006058060.5, filed Dec. 7, 2006 and German Patent Application No. DE102007059361.0, filed Dec. 7, 2007, the contents of such applications being incorporated by reference herein.

BACKGROUND OF THE INVENTION

1. Field of the Invention

The invention relates to a sensor arrangement for measurement of a torque acting on a shaft and to the use of the sensor arrangement in a motor vehicle.

2. Description of the Related Art

Document WO 02/071019 A1 proposes a position sensor for measurement of the torque on a steering shaft, which position sensor comprises a magnetic multipole encoder ring and a magnetic stator with two ferromagnetic wheels comprising a plurality of teeth which engage in one another. In this case, the two ferromagnetic wheels are coupled to additional flux concentrators or collectors via an air gap, which flux concentrators or collectors supply the magnetic field to a magnetic field sensor element. The relative positioning of the ferromagnetic wheels, which act as stator elements of the position sensor, with respect to the flux concentrators in the axial direction with respect to the steering shaft has been found to be relatively difficult in this case with regard to compliance with the relatively stringent accuracy requirements for torque measurement. The precise setting of an air gap between a stator element and flux concentrator in the axial direction is made more difficult by component and manufacturing tolerances.

SUMMARY OF THE INVENTION

An object of the invention is to propose a sensor arrangement for measurement of a torque acting on a shaft, with increased measurement precision.

In view of the foregoing object, the invention relates to the idea of increasing the measurement precision of the sensor arrangement by coupling the at least one flux concentrator to the at least one stator element essentially in the radial direction, with respect to the shaft or the shaft sections, that is to say the at least one flux concentrator is arranged radially in the outer area of the stator element. In consequence, tolerances and inaccuracies relating to component manufacture, assembly of the sensor arrangement and possible relative movements between the respective stator element and the associated flux concentrator have no impact or a relative minor impact in the axial direction.

The magnetic encoder and the stator are each arranged directly or indirectly on the two shaft sections.

The ring of the stator elements is in each case alternatively preferably a ring sector.

The expression a flux concentrator preferably means a collector or a metal collector sheet.

The first and the second shaft section are preferably connected to one another, or are directly or indirectly coupled to one another and can rotate with respect to one another, by means of a torsion bar.

The two shaft sections are preferably each in the form of sleeves which are mounted on the shaft or on the torsion element.

The stator elements and the at least one flux concentrator are expediently at least partially formed from soft-magnetic material. In this case, the magnetic field which is produced by the magnetic encoder particularly preferably at least partially passes through the stator elements.

One or both shaft sections is or are preferably directly or indirectly rotatably mounted, and the torque acting on the shaft results in relative rotation of the two shaft sections with respect to one another, wherein the two shaft elements which are coupled by means of the sensor arrangement are connected to the two shaft sections by welding and/or adhesive bonding and/or pinning and/or a splined shaft fit and/or by some other type of connection.

The expression a magnetic field sensor element means a magneto electric transducer element, preferably a hole element or a magnetoelectric sensor element. A magnetic field sensor element such as this in particular has an integrated, electronic signal processing circuit.

The magnetic encoder is expediently an encoder ring and in particular is formed integrally and such that both stator elements are associated with it. Alternatively, the sensor arrangement preferably has two or more magnetic encoders or encoder rings which are arranged alongside one another on the first shaft section. The magnetic encoder is particularly preferably alternately magnetized, or is a multipole encoder.

It is expedient for the sensor arrangement to have two flux concentrators or one flux concentrator which is jointly associated with the stator elements. One or both flux concentrators is or are in this case in particular attached to in each case one supporting element or to a common supporting element.

The at least one stator element preferably comprises at least one ring or ring sector, in particular a ring sector of less than 90°, in which case the curvature need not necessarily be in the form of a circular arc, wherein the at least one ring or ring sector of the at least one flux concentrator is broader in the axial direction, with respect to the shaft, than the ring of the associated stator element. In consequence, inaccuracies relating to relative positioning of the respective stator element with respect to the flux concentrator have even less impact. Alternatively, and preferably, the mutually associated rings or ring sectors of the stator element and flux concentrator are designed and arranged such that they always overlap in the axial direction and always have an opposite area in the radial direction, during operation of the sensor arrangement. The at least one ring or ring sector of the at least one flux concentrator is particularly preferably so much broader than the ring of the associated stator element that the ring of the stator element cannot be moved in the axial direction out of the area, or cannot project from this area, of the ring or ring sector, associated with it, of the flux concentrator owing to a relative maximum movement in the axial direction between the two mutually associated rings, as a result of the maximum permissible manufacturing and installation tolerances and deflections during operation of the sensor arrangement.

The magnetic coupling between the stator and the at least one flux concentrator is preferably provided essentially in the radial direction with respect to the shaft.

It is preferable for the stator elements to be connected to one another by means of a common connecting element, in particular composed of molded plastic. This results in the relative alignment of the two stator elements with respect to one another being set relatively precisely and firmly. Each of the stator elements particularly preferably has a ring or ring sector with an axial extent for magnetic coupling to the at least one flux concentrator, wherein the stator elements are magnetically non-permeably connected to one another, in particular by means of a common, magnetically non-permeable stator supporting element. This allows the relative position of the stator elements with respect to one another to be set in a defined manner, and this has a positive effect on the measurement precision.

The flux concentrators are expediently magnetically non-permeably connected to one another by means of a common flux concentrator supporting element, and the flux concentrators are, in particular, at least partially jointly insert-molded with plastic, thus making it possible to set the relative positioning of the flux concentrators with respect to one another in a defined manner.

The ring and the fingers of a stator element are preferably each at least partially formed from soft-magnetic material, wherein the fingers are attached to the ring, are aligned such that they project axially from the ring with respect to the shaft and, particularly preferably, are essentially trapezoidal. This embodiment has been found to be particularly suitable for relatively precise guidance of the magnetic field.

It is expedient for the flux concentrator supporting element to have a stop on its outer surface, for positioning in a housing, wherein this stop in particular has a sensor element recess which forms an air gap between the flux concentrators, and at least one magnetic field sensor element is arranged at least partially inserted into this sensor element recess, in order to detect the magnetic field in this air gap. The sensor element recess and/or the magnetic field sensor element which is inserted into it in this case particularly preferably have/has a magnetically non-permeable outer area, such that the air gap between the flux concentrators and the magnetic field sensor element can be set in a defined and relatively precise manner by the magnetic field sensor element being passed through the sensor element recess.

The magnetic encoder or encoder ring expediently has at least two encoder tracks. In this case, the sensor arrangement correspondingly has at least two magnetic field sensor elements, wherein the stator, with both stator elements, is associated with at least one first encoder track, and at least one first magnetic field sensor element is associated therewith. The at least second encoder track is in this case associated with at least one second magnetic field sensor element in order to measure a relative rotation angle between the two shaft sections. This is used in particular to detect a steering angle.

The sensor arrangement preferably has a housing to which the supporting elements are attached and which is formed at least partially from magnetically permeable material, in particular for electromagnetic screening. The housing particularly preferably has a cover composed of magnetically permeable steel. At least one or two magnetic field sensor elements, wherein a first in particular is a Hall element for detection of the torque and the other is a magnetoresistive magnetic field element for detection of a relative rotation angle between the two shaft sections, is or are very particularly preferably arranged from the inside of the housing cover. In addition, and in particular, an evaluation circuit is arranged there and/or the two magnetic field sensor elements as well as the electronic circuit are arranged on a common board or are in the form of an integrated circuit.

It is expedient for the magnetic encoder or encoder ring to be formed integrally. In particular, the magnetic encoder ring is designed such that it has at least two encoder tracks which are offset through essentially 90° with respect to one another, particularly preferably at least one encoder track which runs essentially parallel to the envelope surface of the shaft, and at least one further encoder track runs essentially at right angles thereto.

It is preferable for embodiments as described above to be combined with one another and in particular to complement one another to form an intrinsically closed system. The sensor arrangement is in this case expediently modular.

The sensor arrangement is preferably a pre-tested complete assembly and thus allows relatively simple connection to a steering drive.

The sensor arrangement preferably has a sensor module which comprises one or more flux concentrators and/or all the flux concentrators and at least one magnetic field sensor element and/or all the magnetic field sensor elements, which is arranged at least partially in an air gap between the at least parts of the flux concentrators. The sensor module is particularly preferably in the form of a cover of a housing of the sensor arrangement and the sensor module in this case has its own housing, wherein the sensor module comprises a plug, in order to make electrical contact with the sensor arrangement, and a board which is connected to a plurality of plug pins in particular by means of push-in technology, and on which the at least one magnetic field sensor element and an electronic signal processing circuit are arranged. In this case, the flux concentrators are very particularly preferably metal collecting sheets whose surfaces which supply the majority of the magnetic field to the associated magnetic field sensor element are opposite, in particular in pairs, in the axial direction. In particular and very particularly preferably, the metal collecting sheets are bent essentially through 70° to 100° with respect to the ring segments, wherein the sensor module has two flux concentrators, each having two metal collecting sheets and two magnetic field sensor elements, which are arranged in in each case one air gap between two metal collecting sheets.

The sensor module is in this case expediently a pre-tested component which can be installed in an already existing sensor arrangement.

Those components which are arranged in the interior of the sensor module, such as the at least one magnetic field sensor element by way of example, are preferably completely insert-molded, in which case the sensor module's own housing is essentially particularly preferably composed of solid plastic.

The sensor arrangement and/or the sensor module have/has two or more measurement channels in order to increase the measurement accuracy and/or to make the measurement plausible and/or to improve the reliability.

The invention additionally relates to the use of a sensor arrangement according to aspects of the invention as a torque sensor and/or angle sensor in the steering of a motor vehicle. In this case, in particular, this sensor arrangement is integrated in a steering drive.

The sensor arrangement according to aspects of the invention is intended for use in automation and in machines and generators, that is to say in motor vehicles for measurement of a torque and optionally of a rotation angle of a shaft. Use is expediently intended in this case in motor vehicles, in particular in steering systems. The sensor arrangement according to aspects of the invention is intended for use in systems which have at least one shaft whose torque is intended to be detected. In this case, it is intended in particular that the sensor arrangement be arranged on a torsion element which connects two shaft segments to one another. Motor vehicles and automation systems are particularly preferably proposed as a field of use of the sensor arrangement. Use in the steering system of a motor vehicle is particularly preferred.

These and other aspects of the invention are illustrated in detail by way of the embodiments and are described with respect to the embodiments in the following, making reference to the Figures.

BRIEF DESCRIPTION OF THE DRAWINGS

The invention is best understood from the following detailed description when read in connection with the accompanying drawing. Included in the drawing are the following figures.

DETAILED DESCRIPTION OF THE PREFERRED EMBODIMENTS

Figure 1:
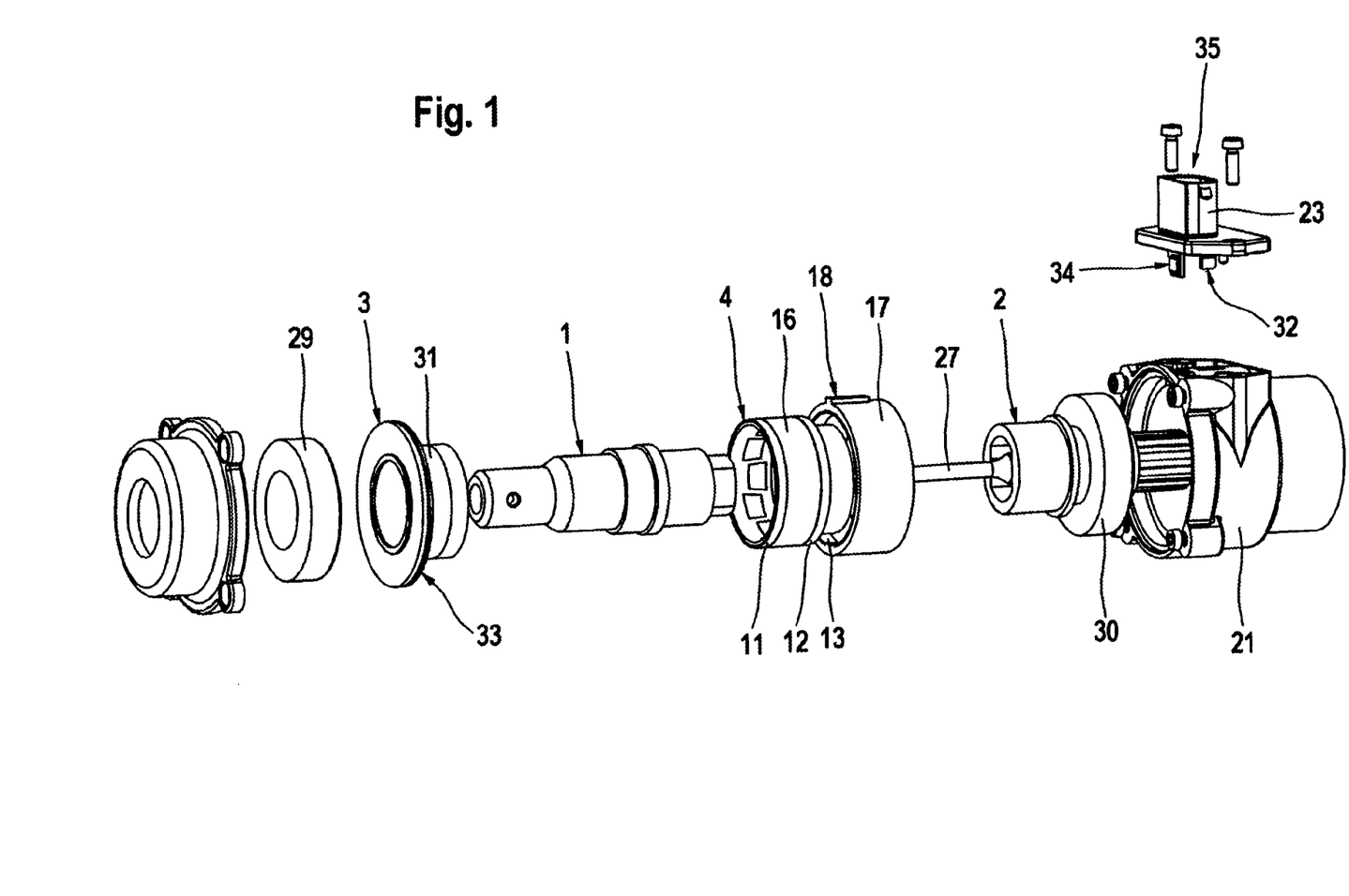
FIG. 1 shows one exemplary embodiment of a sensor arrangement in the form of an exploded drawing.
Figure 2:
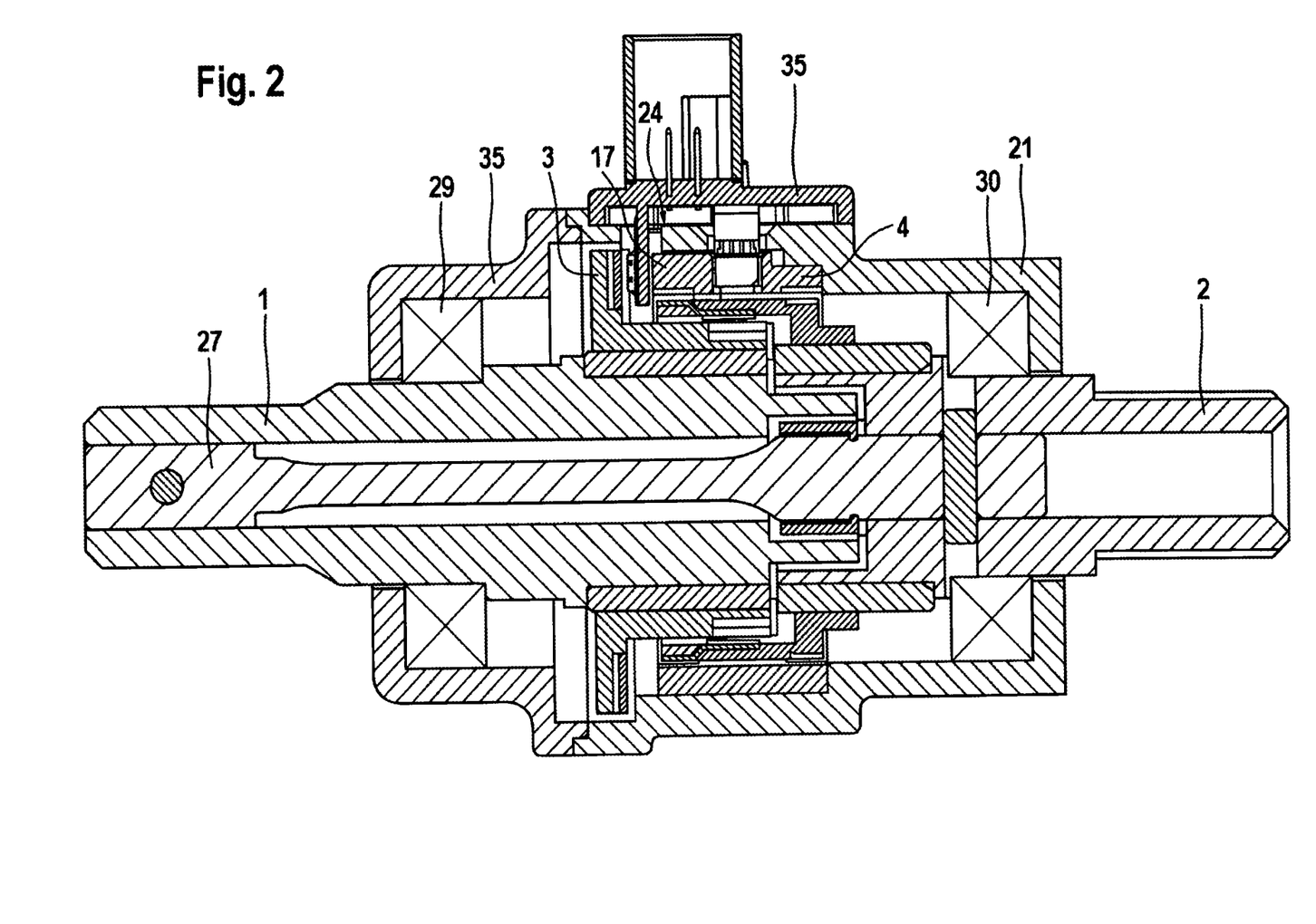
FIG. 2 shows this example of a sensor arrangement in the form of a side section.

FIG. 1 shows an example of a sensor arrangement in the form of an exploded drawing. This has a first shaft section 1, which acts as an input shaft of the sensor arrangement, and a second shaft section 2, which is used as an output shaft of the sensor arrangement. The two shaft sections 1, 2 are in this case connected to one another by a torsion bar 27. An integrally formed magnetic encoder 3, comprising two encoder tracks 31 and 33, is arranged on the first shaft section 1 in which case an encoder track 33 which is arranged on the end face is associated with a magnetic field sensor element 34 in order to determine a steering angle, and an encoder track 31 is associated with a magnetic field sensor element 32 in order to determine the torque acting on the steering shaft. The shaft sections 1 and 2 are each connected by means of a bearing 29 and 30 to the housing 21 of the sensor arrangement. A stator 4 or stator assembly is arranged on the second shaft section 2, comprising two stator elements which are connected to a common stator supporting element 16 by injection molding. The example of a sensor arrangement has two flux concentrators, molded together and connected by a flux concentrator supporting element 17 to a stop for positioning 18. The stator elements in this case each comprise a ring 11, 12, each of which has an associated ring 13 and a ring, which cannot be seen or is concealed, of a flux concentrator, with the respectively mutually associated rings being magnetically coupled to one another via an air gap. The housing 21 has a cover 35 which has a board, which cannot be seen or is concealed, on its inside, on which board magnetic field sensor elements 32 and 34 are arranged. On its outside, the cover 35 has a plug 23 for making electrical contact with the sensor arrangement. The cover 35 is attached to the housing 21 by means of screw connections. By way of example, the cover 35 has a magnetic screen, which is not illustrated. FIG. 2 illustrates this example of a sensor arrangement in the form of a cut-open side view, illustrated on a board 24 which, for example, is flexible.

Figure 3:
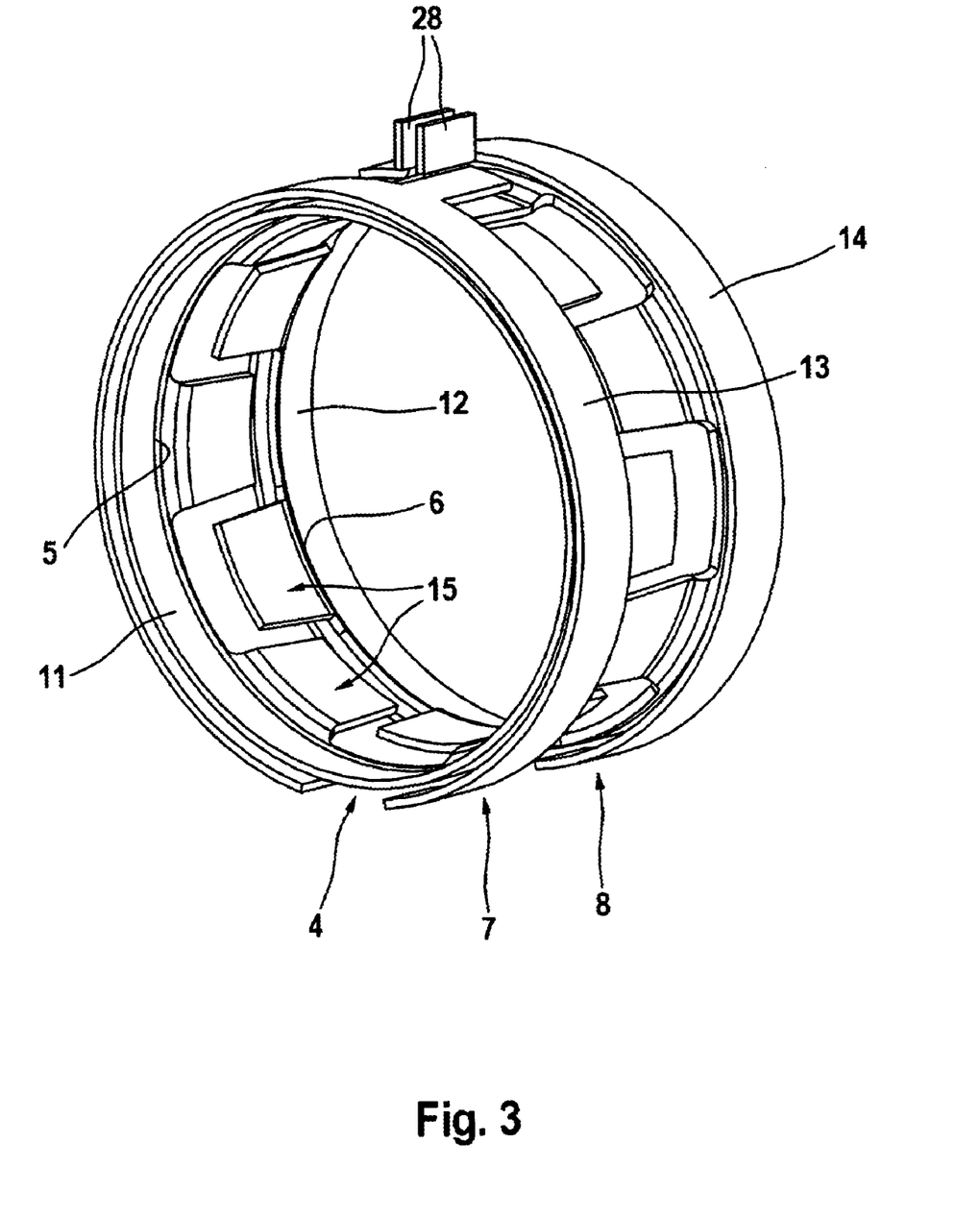
FIG. 3 shows an example of a stator.

By way of example, FIG. 3 shows a stator 4 comprising two stator elements 5, 6 each having a ring 11, 12, and fingers 15 which are arranged thereon, project axially, and are essentially trapezoidal. These rings 11, 12 are coupled in a non-contacted manner via an air gap to in each case one ring segment or ring sector 13, 14 of the flux concentrators 7, 8. By way of example, the ring segments 13, 14 overhang the rings 11, 12 of the stator elements on both sides in the axial direction. Flux concentrators 7, 8 each have a metal collecting sheet 28, which supply the magnetic field to be detected to a magnetic field sensor element, which is not illustrated.

Figure 4:
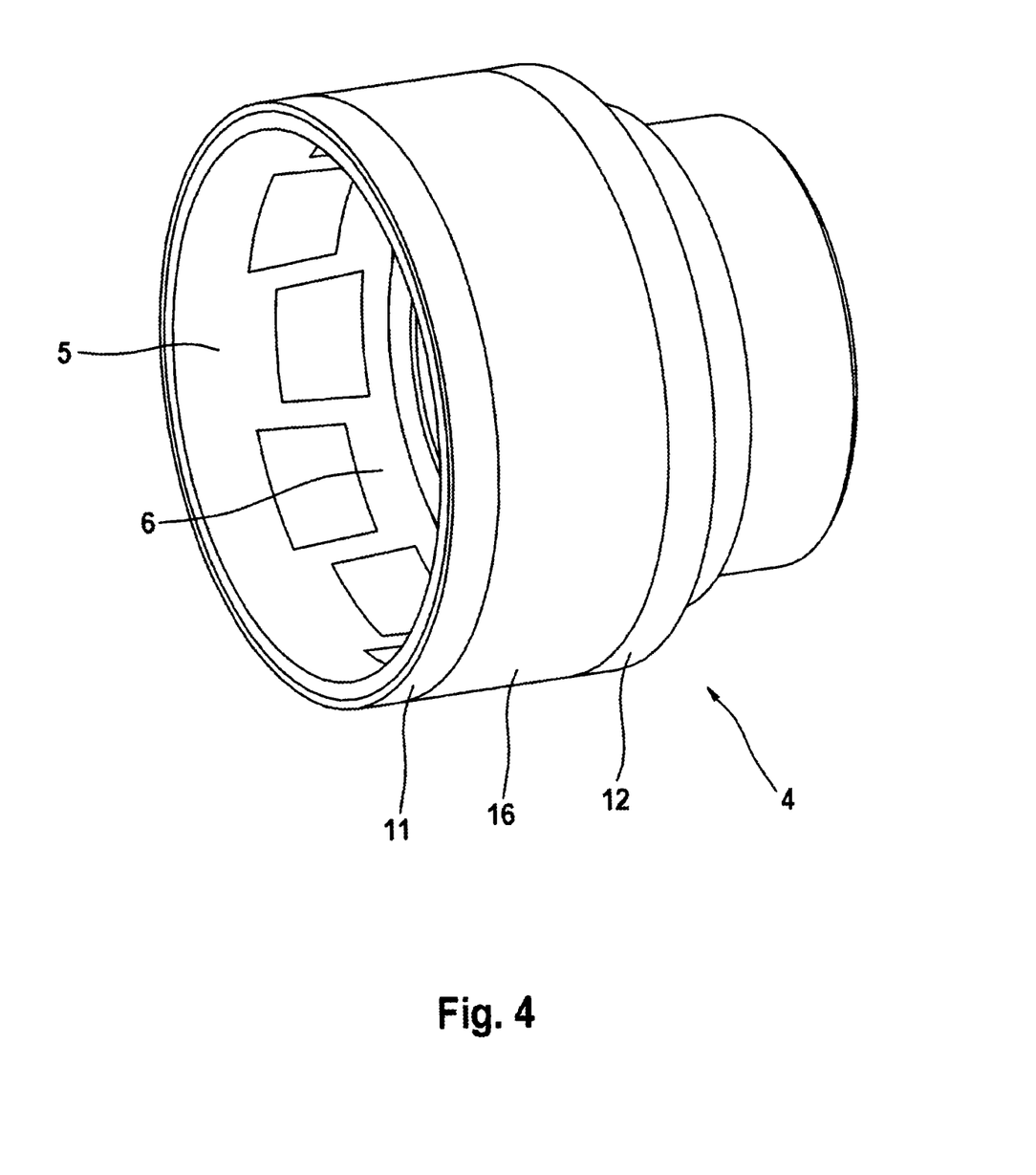
FIG. 4 shows an exemplary embodiment of a stator comprising a stator supporting element.

FIG. 4 shows an example of a stator 4 whose stator elements 5, 6, each comprising a ring 11, 12, are connected by means of a common stator supporting element 16, with the two stator elements 5, 6 being partially insert-molded by means of the stator supporting element 16.

Figure 5:
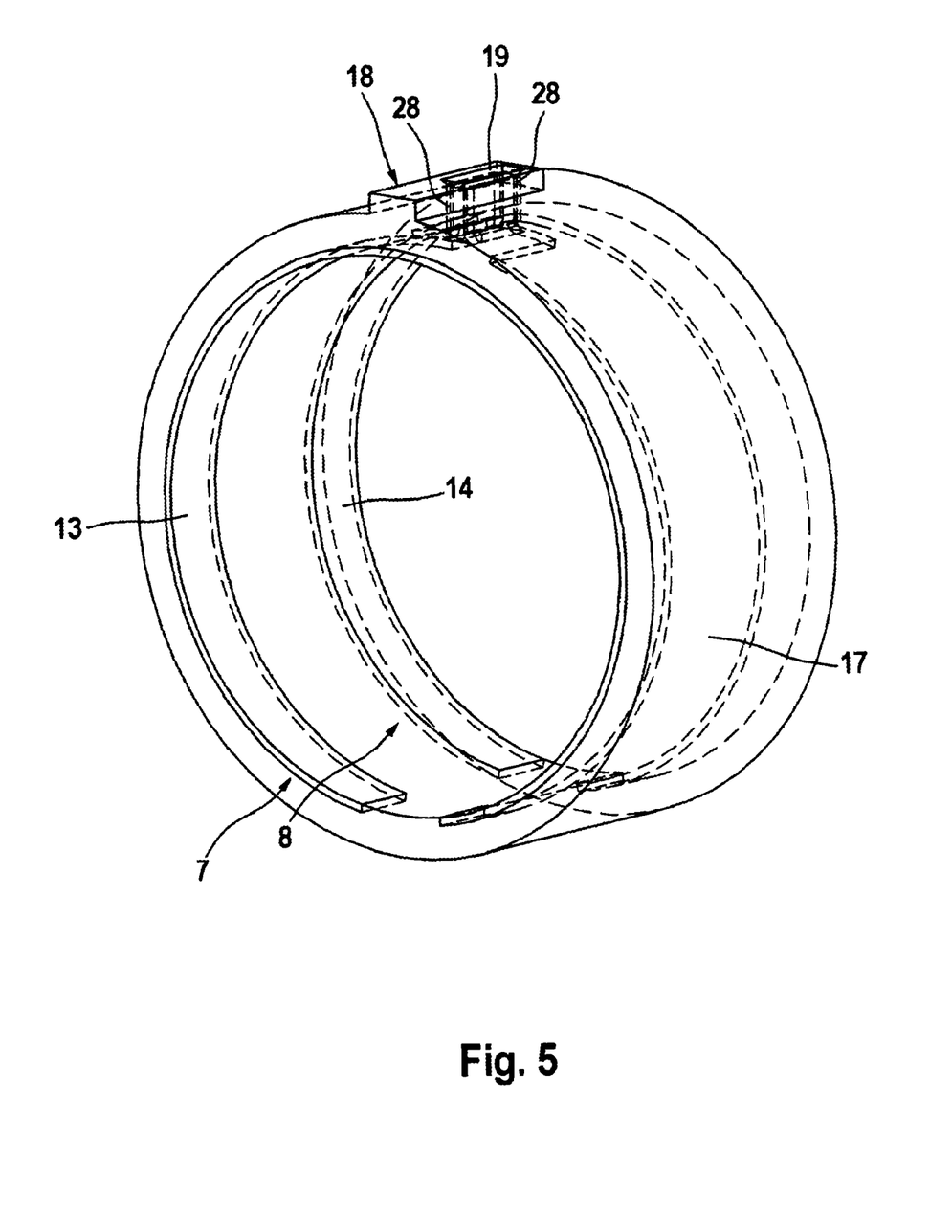
FIG. 5 shows two examples of flux concentrators having a common flux concentrator supporting element.

By way of example, FIG. 5 shows two flux concentrators 7, 8, comprising rings 13, 14 and metal collecting sheets 28. In this case, flux concentrators 7, 8 are partially insert-molded by the common flux concentration supporting elements 17, which has a stop for positioning 18, in which the metal collecting plates 28 are incorporated and are insert-molded thereby. The air gap which is formed by the metal collecting sheets 28 is partially exposed through a sensor element recess 19, such that a magnetic field sensor element, which is not illustrated, can be inserted into this air gap or this sensor element recess 19, and can detect the magnetic field.

Figure 6:
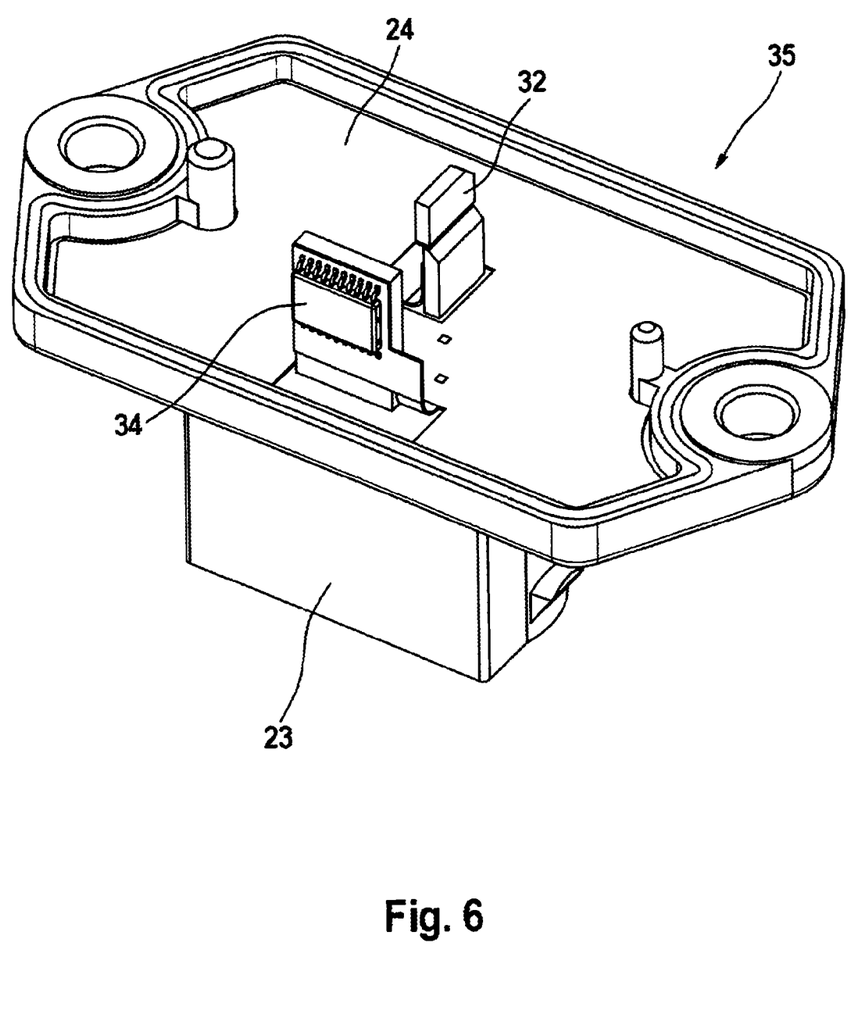
FIG. 6 shows an example of a cover of the sensor arrangement.

FIG. 6 shows an example of a cover 35 of the sensor arrangement. This has a plug 23 on its outside and a board 24 on its inside. Magnetic field sensor elements 32 and 34 for measurement of a torque 32 and of a steering angle 34 are mounted on the board 24. In this case, the magnetic field sensor element 32 is suitable for introduction into or immersion in a sensor element recess, which is not illustrated.

Figure 7:
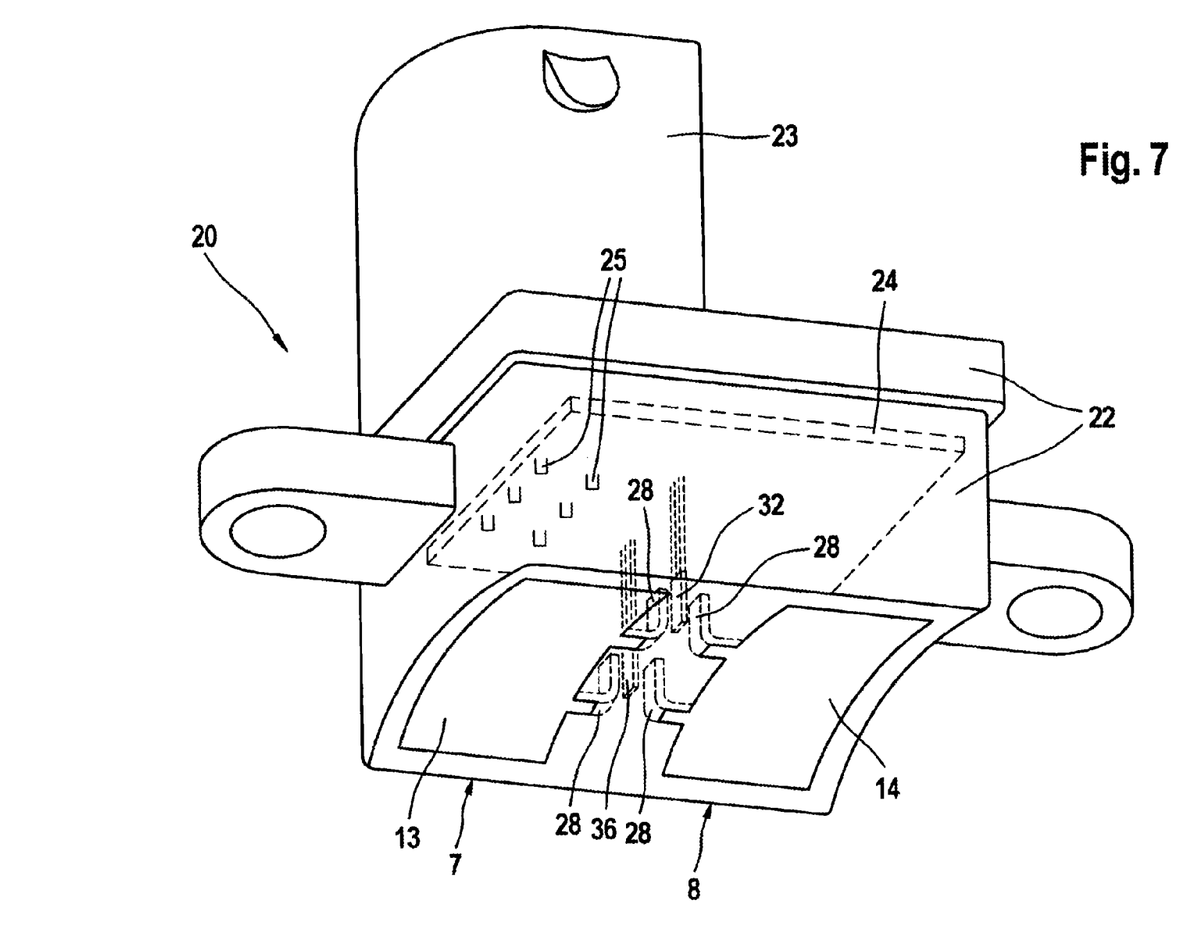
FIGS. 7, 8 show exemplary embodiments of a sensor module.

FIG. 7 shows an exemplary embodiment of a sensor module 20 which, for example, is designed to detect a torque, and has its own housing 22. By way of example, the sensor module 20 is in the form of a pre-tested unit which can optionally be installed retrospectively together with a sensor arrangement without flux concentrators, which has already been installed in a steering system. By way of example, the sensor module 20 is in this case attached, for example by screwing, to a housing, which is not illustrated, of a sensor arrangement or to a housing, which is not illustrated, of a steering drive, in which a sensor arrangement such as this is integrated. The sensor module 20 has two integrated flux concentrators 7, 8 with ring sectors 13, 14 on its underside. Flux concentrators 7, 8 each have two metal collecting sheets 28 which are bent essentially through 90° upward and form an air gap in which a magnetic field sensor element 32, 36 is in each case arranged, for example a Hall element. On its top, the sensor module 20 has a plug 23 which is integrally connected to the housing 22 and whose plug pins 25 make contact with a board 24 by means of push-in technology, on which board 24 the magnetic field sensor elements 32 and 36 as well as an electronic signal processing circuit, which is not illustrated, are arranged.

Figure 8:
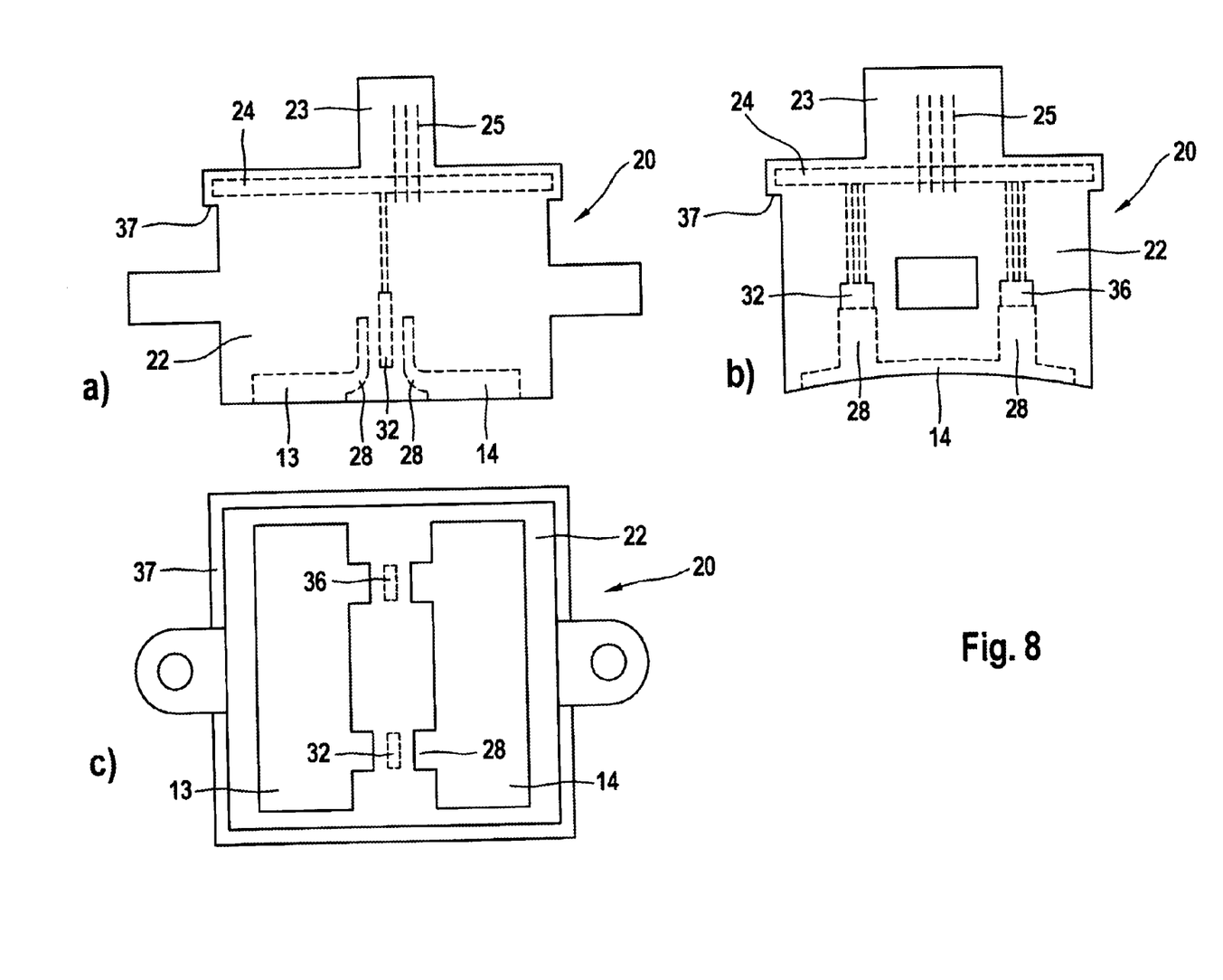

FIG. 8 likewise shows one exemplary embodiment of a sensor module 20, in the form of a front view in FIG. 8a), a side view in FIG. 8b) and a view from underneath in FIG. 8c). This example of a sensor module 20 has two measurement channels in order to increase the measurement accuracy and/or reliability and/or for plausibility, comprising the magnetic field sensor elements 32 and 36 and the metal collecting sheets 28 which are associated with them in pairs and are integrally connected to the flux concentrator ring sectors 13 and 14 which are incorporated in the bottom of the housing 22. The magnetic field sensor elements 32 and 36 are electrically conductively connected to the board 24, and are attached to it, via pins. Plug pins 25 of the plug 23 which is integrally connected to the housing 22 are pushed into the board 24. The housing 22, which, for example, comprises an injection molding and in particular and optionally fills the free internal area of the sensor module 20, has, for example, a circumferential fitting-in edge 37 for use and fitting of the sensor module 20 as a cover in a sensor arrangement.

In one exemplary embodiment, which is not illustrated, of the sensor module, this sensor module additionally has an integrated magnetic field sensor element, which in particular is arranged offset through 90° with respect to the others, for detection of a steering angle, to be precise for detection of the magnetic field of an encoder track for steering angle detection.

Figure 9:
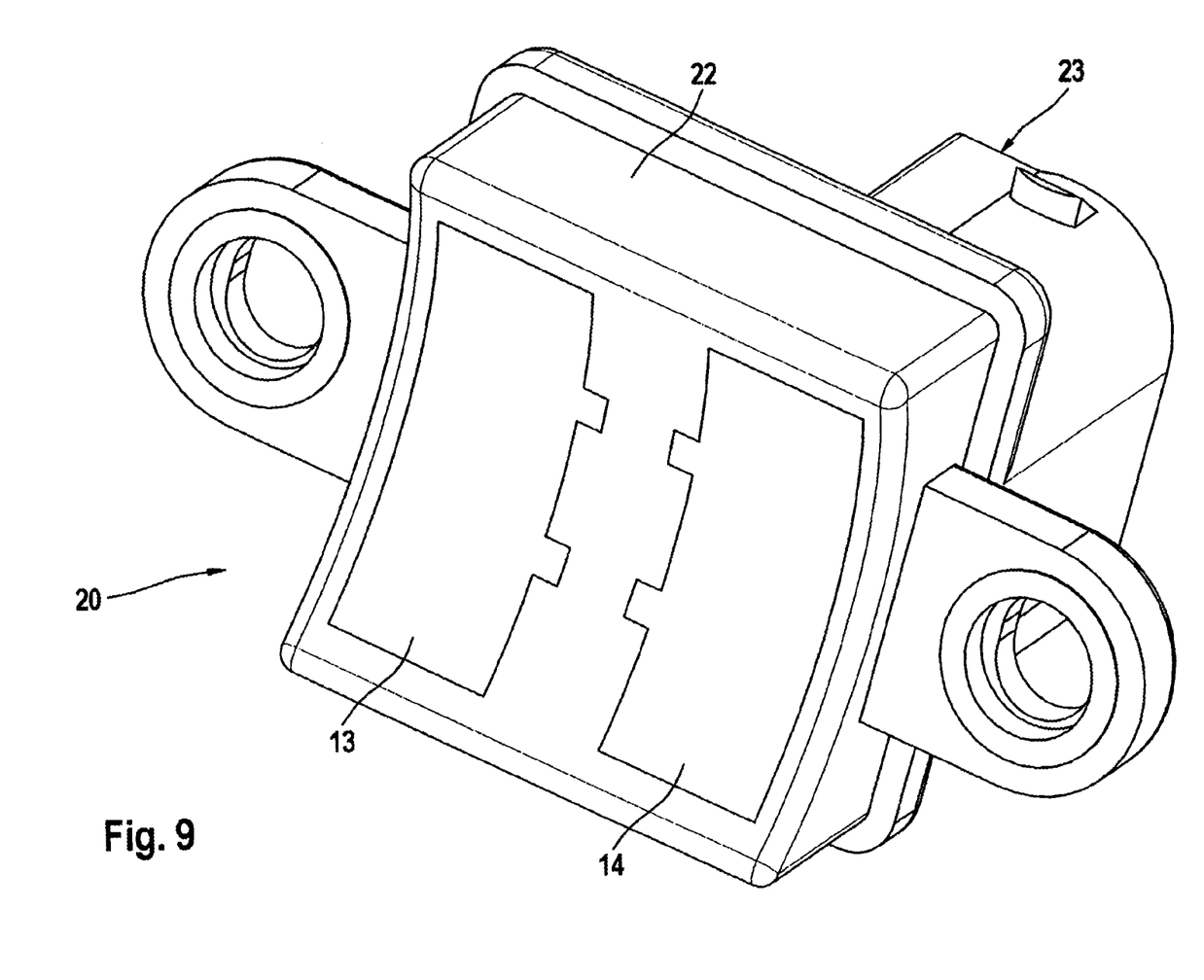
FIG. 9 shows an example of a sensor module, from underneath.

FIG. 9 shows an example of a sensor module 20 with its own housing 22, plug 23 and the ring segments 13, 14, which are formed and arranged on its underside, of the flux concentrators.

Figure 10:
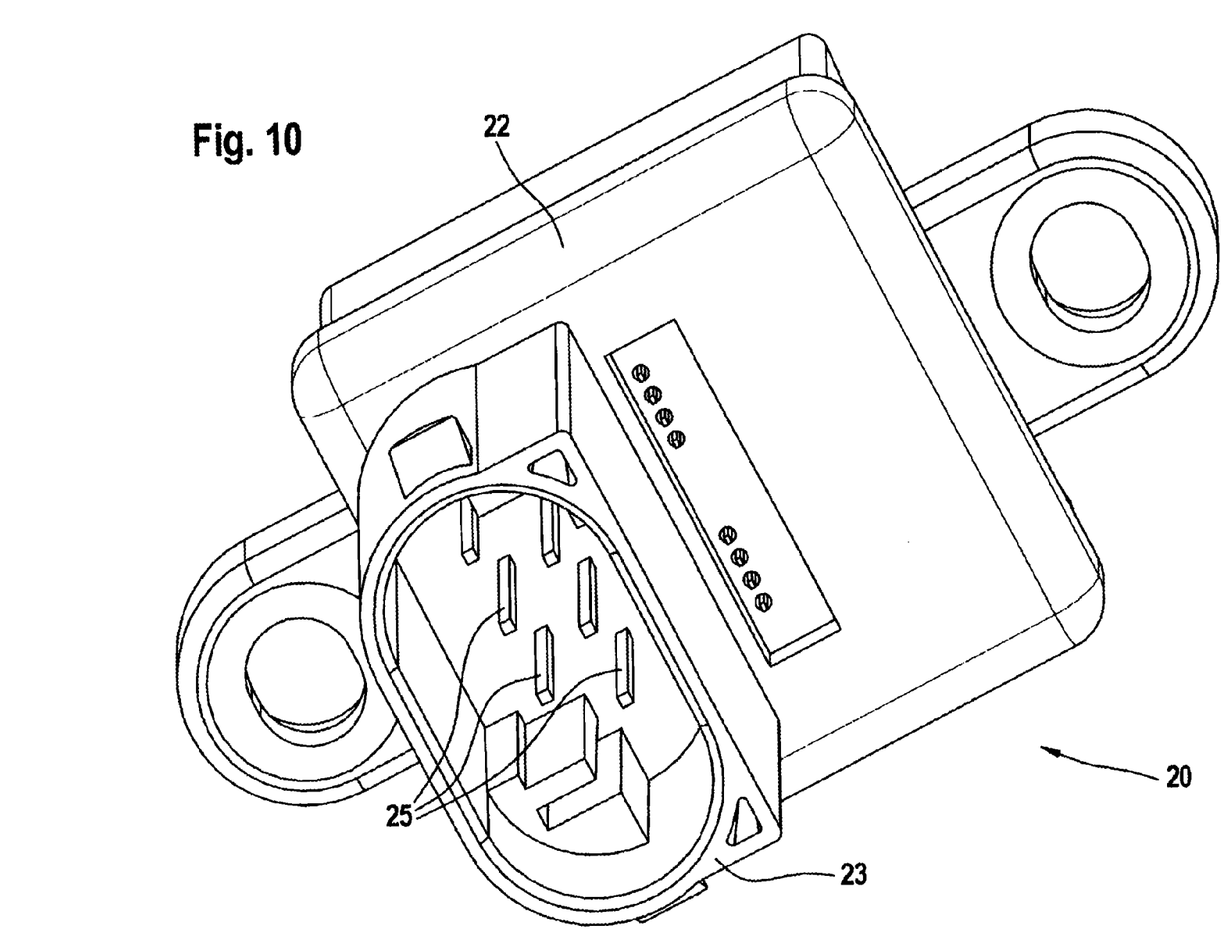
FIG. 10 shows an example of a sensor module, from above.

FIG. 10 shows the top of an example of a sensor module 20 with its own housing 22 and plug 23, showing plug pins 25.

Figure 11:
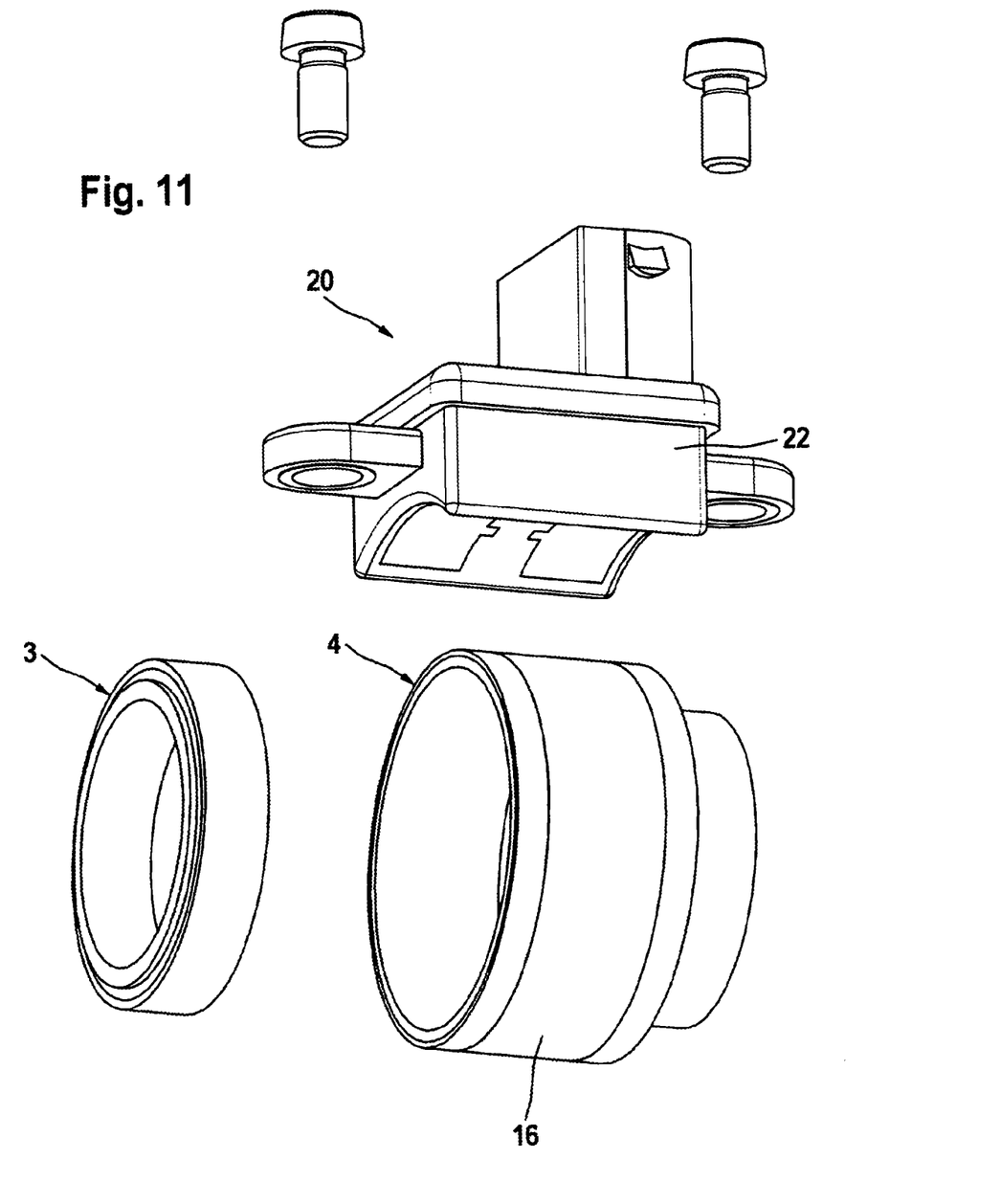
FIG. 11 shows an example of the interaction of a sensor module with a stator and a magnetic encoder.

FIG. 11 shows one exemplary embodiment of an integrated sensor module 20 with its own housing 22 interacting with a stator 4, comprising two stator elements, which cannot be seen individually but are connected by means of a common stator supporting element 16, and a magnetic encoder 3, in the form of an exploded drawing. The sensor module 20 is in this case intended to be used as a cover and for attachment to the housing, which is not illustrated, of the sensor arrangement.

While preferred embodiments of the invention have been described herein, it will be understood that such embodiments are provided by way of example only. Numerous variations, changes and substitutions will occur to those skilled in the art without departing from the spirit of the invention. It is intended that the appended claims cover all such variations as fall within the spirit and scope of the invention.

The invention claimed is:

1. A sensor arrangement for measurement of a torque acting on a shaft, wherein the shaft has a first shaft section and a second shaft section and the two shaft sections are configured to rotate with respect to one another, said sensor arrangement comprising:
   at least one magnetic encoder arranged on the first shaft section; and
   a stator arranged on the second shaft section, wherein the stator has two stator elements each having projecting fingers,
   at least one flux concentrator associated with each of the stator elements or jointly associated with the stator elements, the at least one flux concentrator being configured to either directly or indirectly supply to a magnetic field sensor element a magnetic field which is to be detected and is produced by the at least one magnetic encoder,
   wherein the at least one flux concentrator comprises a ring or ring sector, is arranged in a radial outer area with respect to at least one stator element and is magnetically coupled thereto via an air gap, such that an innermost edge of the at least one flux concentrator is radially outward from an outermost edge of the at least one stator element.

2. The sensor arrangement as claimed in claim 1 further comprising two flux concentrators, wherein the flux concentrators are magnetically non-permeably connected to one another by way of a common flux concentrator supporting element.

3. The sensor arrangement as claimed in claim 2, wherein the flux concentrators are at least partially jointly insert-molded with plastic.

4. The sensor arrangement as claimed in claim 2, wherein the flux concentrator supporting element includes a stop on its outer surface, for positioning in a housing, wherein the stop includes a sensor element recess which forms an air gap between the flux concentrators, and
   at least one magnetic field sensor element is arranged at least partially inserted into the sensor element recess in order to detect a magnetic field in the air gap.

5. The sensor arrangement as claimed in claim 1, wherein the ring and the fingers of a stator element are each at least partially formed from soft-magnetic material, and the fingers that are attached to the ring are aligned such that the fingers project axially from the ring with respect to the shaft.

6. The sensor arrangement as claimed in claim 5, wherein the fingers are substantially trapezoidal.

7. The sensor arrangement as claimed in claim 1, wherein the sensor arrangement includes a sensor module which comprises one or more flux concentrators and at least one magnetic field sensor element which is arranged in an air gap between at least parts of the flux concentrators of the sensor module.

8. The sensor arrangement as claimed in claim 7, wherein the sensor module covers a housing of the sensor arrangement, wherein the sensor module comprises a plug that is configured to establish electrical contact with the sensor arrangement, and a board which is connected to a plurality of plug pins, wherein the at least one magnetic field sensor element and an electronic signal processing circuit are arranged on the board.

9. The sensor arrangement as claimed in claim 8, wherein the board is connected to the plurality of plug pins by means of push-in technology.

10. The use of the sensor arrangement as claimed in claim 1 in a steering system of a motor vehicle.

11. A sensor arrangement for measurement of a torque acting on a shaft, wherein the shaft has a first shaft section and a second shaft section and the two shaft sections are configured to rotate with respect to one another, said sensor arrangement comprising:
    at least one magnetic encoder arranged on the first shaft section; and
    a stator arranged on the second shaft section, wherein the stator has two stator elements each having projecting fingers, each stator element comprising at least one ring or ring sector;
    at least one flux concentrator associated with each of the stator elements or jointly associated with the stator elements, the at least one flux concentrator being configured to either directly or indirectly supply to a magnetic field sensor element a magnetic field which is to be detected and is produced by the at least one magnetic encoder,
    wherein the at least one flux concentrator comprises a ring or ring sector, is arranged in a radial outer area with respect to at least one stator element and is magnetically coupled thereto via an air gap, and
    wherein the at least one ring or ring sector of the at least one flux concentrator is larger in an axial direction than the ring or ring sector of the associated stator element.

12. The sensor arrangement as claimed in claim 11, wherein the at least one ring or ring sector of the at least one flux concentrator is larger than the ring of the associated stator element such that the ring of the stator element cannot be moved in the axial direction out of the area of the corresponding ring or ring sector of the flux concentrator by virtue of a relative maximum movement in the axial direction between the associated rings, as a result of a maximum permissible manufacturing and installation tolerances and deflections during operation of the sensor arrangement.

13. The sensor arrangement as claimed in claim 11, wherein each of the stator elements has a ring, and the stator elements are magnetically non-permeably connected to one another by way of a common magnetically non-permeable stator supporting element.

* * * * *